United States Patent [19]

Calvert et al.

[11] Patent Number: 4,802,583
[45] Date of Patent: Feb. 7, 1989

[54] ARTICLE CONTAINER WITH OVERWRAP

[75] Inventors: Rodney K. Calvert, Dunwoody; Prentice J. Wood, Hapeville, both of Ga.

[73] Assignee: The Mead Corporation, Dayton, Ohio

[21] Appl. No.: 167,094

[22] Filed: Mar. 11, 1988

[51] Int. Cl.⁴ .................. B65D 75/28; B65D 17/28
[52] U.S. Cl. .................... 206/427; 206/139; 206/628; 229/40; 229/52 B; 229/52 BC
[58] Field of Search ............ 206/139, 140, 427, 428, 206/429, 431, 620, 628; 229/23 R, 40, 52 B, 52 BC

[56] References Cited

U.S. PATENT DOCUMENTS

| | | | |
|---|---|---|---|
| 2,310,408 | 2/1943 | Ehrenfeld | 229/52 B |
| 2,315,094 | 3/1943 | Rehfield | 229/52 B |
| 3,066,795 | 12/1962 | Mansfield | 206/139 |
| 3,346,167 | 10/1967 | Schmidt | 206/427 |
| 3,815,808 | 6/1974 | Bunnell | 206/427 |
| 3,854,652 | 12/1974 | Brackmann et al. | 229/52 B |
| 4,084,693 | 4/1978 | Culpepper | 206/427 |
| 4,394,903 | 7/1983 | Bakx | 206/427 |
| 4,440,340 | 4/1984 | Bakx | 206/427 |
| 4,482,090 | 11/1984 | Milliens | 206/427 |
| 4,577,709 | 3/1986 | Oliff | 206/427 |

FOREIGN PATENT DOCUMENTS

| | | | |
|---|---|---|---|
| 1331618 | 5/1963 | France | 229/23 R |
| 2008542 | 6/1979 | United Kingdom | 206/628 |

Primary Examiner—Jimmy G. Foster
Attorney, Agent, or Firm—Rodgers & Rodgers

[57] ABSTRACT

A reuseable open top case having interconnected bottom, side and end walls is provided with a disposable overwrap which includes panels overlying the open top, side, end and bottom walls.

8 Claims, 5 Drawing Sheets

ARTICLE CONTAINER WITH OVERWRAP

TECHNICAL FIELD

This invention relates to the packaging and distribution of consumer items such for example as bottles of beer, soft drinks and the like.

BACKGROUND ART

U.S. Pat. No. 3,815,808 for Packaging Structure which issued June 11, 1974 discloses and claims a bottle carrying tray which is reuseable and a cardboard sleeve which telescopes downwardly over the open top of the tray. This arrangement does not afford a cover for the bottom of the tray. The cardboard sleeve is arranged tightly to grip the side and end walls of the tray. This tray and sleeve arrangement does not lend itself to machine handling and requires a substantial amount of labor. In practice, a tray formed according to U.S. Pat. No. 3,815,808 normally utilizes a sleeve formed of E-flute paperboard which may have a wavy external surface having a deleterious effect on print copy which detracts from the appearance of the tray sleeve.

U.S. Pat. No. 3,854,652 for "Blank for Container Cover" issued Dec. 17, 1974 discloses a blank from which a sleeve may be formed and which preferably utilizes two layers of cardboard, the sleeve being disposable as is the sleeve of U.S. Pat. No. 3,815,808.

SUMMARY

According to this invention in one form, a reuseable case formed preferably of corrugated boxboard or molded plastic includes a rectangular bottom wall, a pair of side walls joined to the side edges of the bottom wall and projecting upwardly therefrom together with a pair of end walls joined to opposite end edges of the bottom wall and to the end edges of the side wall to form an open top structure together with a disposable overwrap having a rectangular main panel overlying the case together with side panels foldably joined to side edges of the main panel, an upper end panel foldably joined to each end edge of the main panel and projecting downwardly, collapsible web structure interconnecting each end edge of each of the upper end panels with the adjacent end edge of each f the side panels together with a rectangular bottom panel foldably joined to the bottom edge of one of the side panels and releasably secured to the bottom edge of the other side panel, lower end panels joined to opposite end edges of the bottom panel and disposed in overlying relation with the upper end panels, collapsible web structure interconnecting one end edge of each of the lower end panels with the adjacent edge of one of the side panels, an end flap foldably joined to each end edge of the other side panel and secured to the inner surface of the adjacent one of the lower panels and locking tabs formed on a locking sleeve interconnected with the other side panel and arranged for cooperation with locking apertures formed in the bottom panel.

BEST MODE OF CARRYING OUT THE INVENTION

Figure 1:
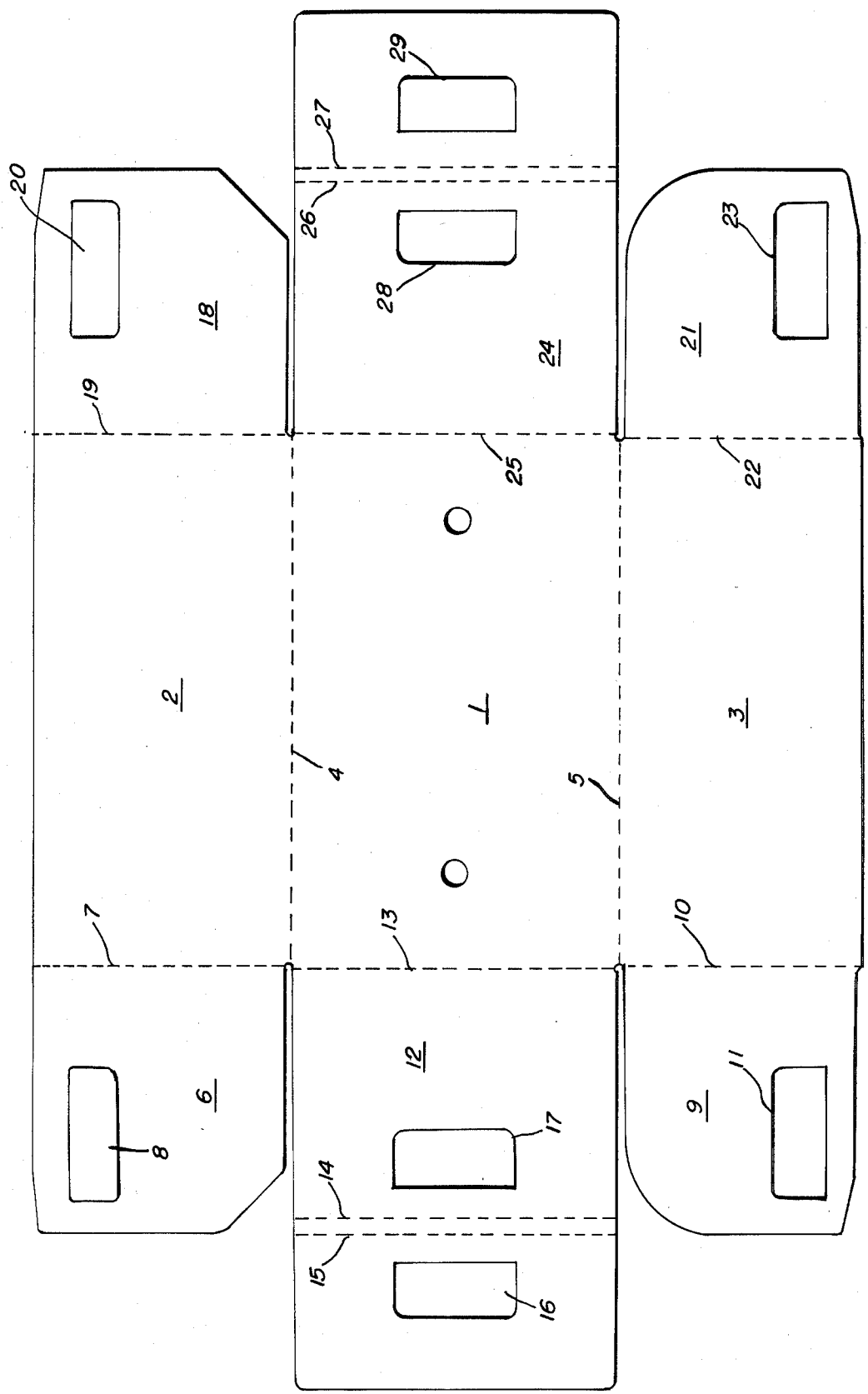
FIG. 1 is a plan view from the inside of a blank from which a conventional article case is formed.
Figure 2:
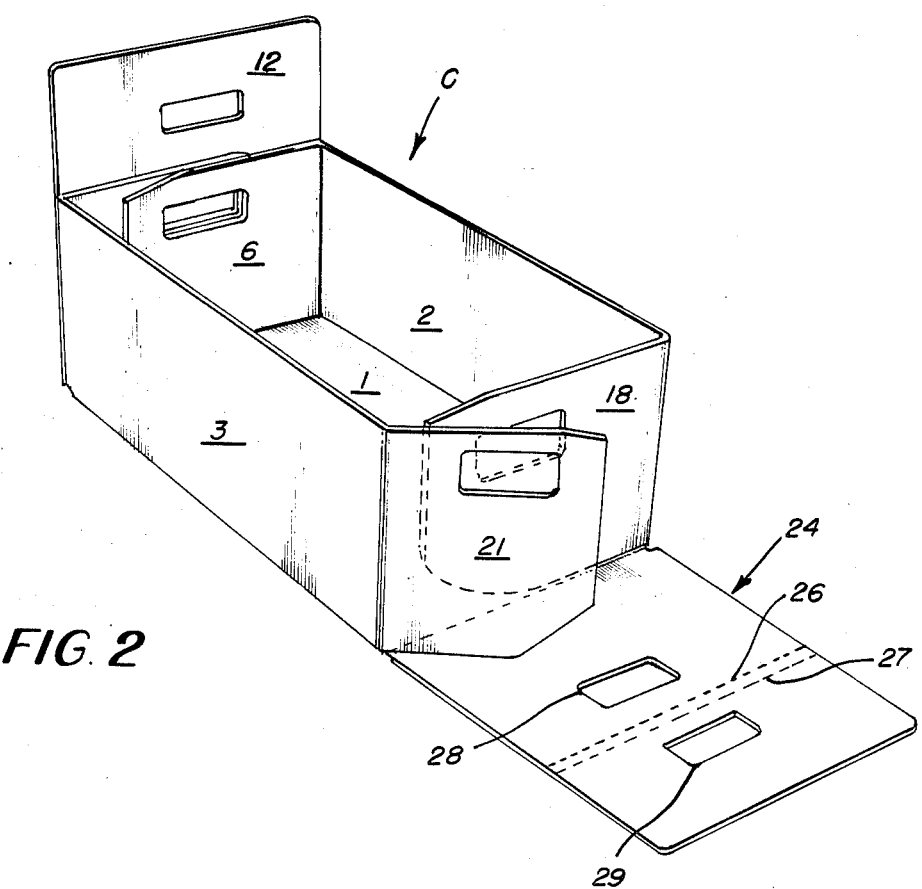
FIG. 2 is a view of a case in the process of being formed from the blank of FIG. 1.
Figure 3:
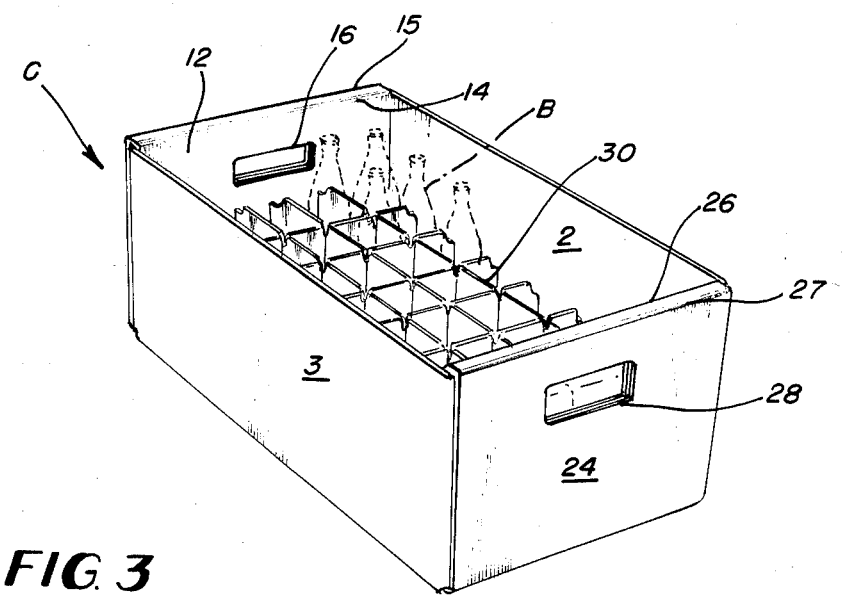
FIG. 3 is a view of a completed case having article separating partitions therein.

The corrugated case shown in FIGS. 1, 2 and 3 is of conventional construction and includes a bottom wall 1 to the side edges of which side walls 2 and 3 are foldably joined along fold lines 4 and 5 respectively.

One end wall of the case includes end wall element 6 foldably joined to side wall 2 along fold line 7 and in which a hand gripping aperture 8 is formed together with end wall element 9 which is foldably joined to side wall 3 along fold line 10 and which includes a hand gripping aperture 11. End wall element 12 is foldably joined to bottom wall 1 along fold line 13 and includes fold lines 14 and 15 as well as hand gripping apertures 16 and 17.

At the other end of the case, end wall element 18 is foldably joined to side wall 2 along the fold line 19 and includes a hand gripping aperture 20. In addition, end wall element 21 is foldably joined to side wall 3 along fold line 22 and includes hand gripping aperture 23. End wall element 24 is foldably joined to bottom wall 1 along fold line 25 and a pair of fold lines 26 and 27 are formed across the panel 24. Hand gripping apertures 28 and 29 are formed in end wall panel 24.

As is well known side panels 2 and 3 are folded upwardly into normal relation to bottom wall 1. Panel 9 is then folded inwardly followed by inward folding of panel 6. End panel 12 is folded over panels 6 and 9 and glued in place with the hand gripping apertures 8, 11, 16 and 17 in coincidence with each other. The other end of the blank is similarly formed to complete the wall as shown in FIG. 3.

Partition structure generally designated by the numeral 30 is included within the reuseable case and a plurality of bottles are indicated in phantom and designated at B in FIG. 3.

Figure 4:
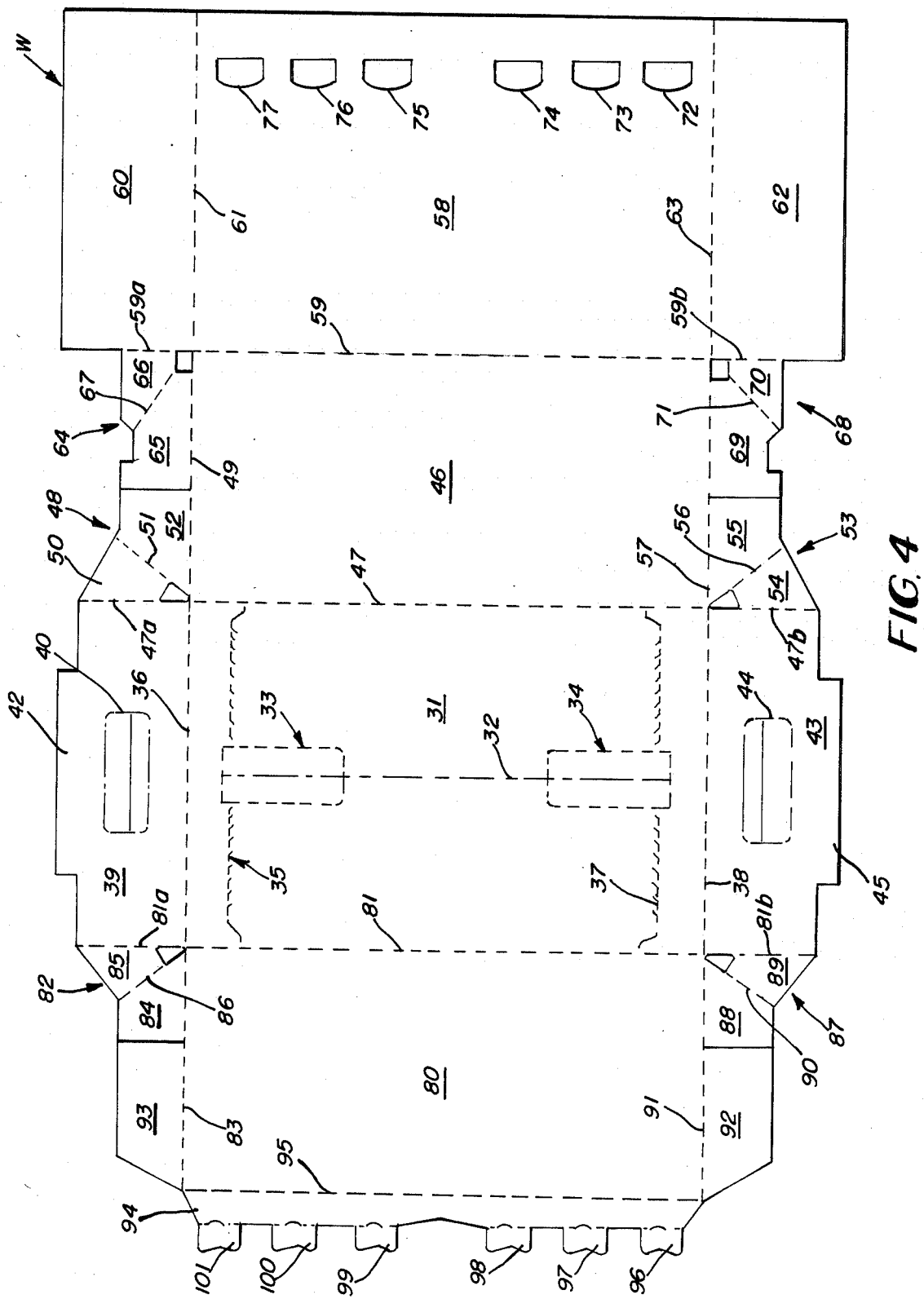
FIG. 4 is a plan view from inside of a blank used to form a disposable overwrap according to one aspect of this invention.

The disposable overwrap for the case C is formed from the blank shown in FIG. 4 from the inside of the blank and includes a main panel 31 and a perforated medial tear line 32 which interconnects a pair of hand access structures 33 and 34. A weakened severance line 35 is formed in main panel 31 and is interrupted at its mid-portion by the structure 33 and is formed in closely spaced parallel relation to the end edge 36 of main panel 31. Similarly a weakened severance line 37 is interrupted at its midpoint by the hand access structure 34 and is arranged in closely spaced parallel relation to the end edge 38 of main panel 31. When assembled about the case, the main panel 1 overlies and closes the top open end of the case C.

An upper end panel 39 is foldably joined to main panel 31 along a fold line 36 and includes hand gripping aperture 40 as well as a mid-portion 42 which projects downwardly in the finished product.

At the other end of the structure an upper end panel 43 is foldably joined to main panel 31 along a fold line 38 and includes hand gripping aperture 44 as well as a projecting part 45 which projects downwardly in the finished product.

A side panel 46 is foldably joined to a side edge of main panel 31 along fold line 47. Web structure 48 is foldably joined to upper end panel 39 along fold line 47 and to an end of side panel 46 along fold line 49. Web structure 48 includes a web panel 50 foldably joined along fold line 51 to another web panel 52.

In like fashion, the upper end panel 43 is foldably joined to side panel 46 by web structure 53 which includes web panels 54 and 55 which are foldably joined to each other by fold line 56. Web panel 54 is foldably joined to upper end panel 43 along fold line 47b and web panel 55 is foldably joined to side panel 46 along fold line 57.

Bottom panel 58 is foldably joined to side panel 46 along fold line 59. Lower end panel 60 is foldably joined to bottom panel 58 along fold line 61 and lower end panel 62 is foldably joined to bottom panel 58 along fold line 63.

One end of lower end panel 60 is interconnected with side panel 46 by web structure 64 which includes web panels 65 and 66 which are interconnected by fold line 67. Web 65 is foldably joined to side panel 46 along fold line 49 and web panel 66 is foldably joined to lower end panel 60 along of fold line 59a.

At the other end of side panel 46, web structure 68 is provided and includes web panels 69 and 70 which are interconnected by fold line 71. Web 69 is foldably joined to side panel 46 along fold line 57 and web panel 70 is foldably joined to lower end panel 62 by fold line 59b. Locking apertures 72-77 of known construction are formed in bottom panel 58.

At the other end of the blank, side panel 80 is foldably joined to main panel 31 along fold line 81. Web structure 82 foldably interconnects an end 81a of upper end panel 39 with the adjacent end 83 of side panel 80. Web structure 82 includes web panels 84 and 85 which are foldably adjoined along fold line 86.

Similar web structure 87 is at the other end of side panel 80 and includes web panels 88 and 89 which are foldably adjoined along fold line 90. Web panel 88 is foldably joined to side panel 80 along fold line 91 while panel 89 is foldably joined to lower end panel 43 along fold line 81b.

A flap 92 is foldably joined to side panel 80 along fold line 91 and a similar end flap 93 is foldably joined to side panel 80 along fold line 83.

For the purpose of interlocking opposite ends of the blank, a locking strip 94 is foldably joined to side panel 80 along fold line 95 and includes locking tabs 96-101 which are foldably adjoined in known manner to the left hand edge of locking strip 94.

Figure 5:
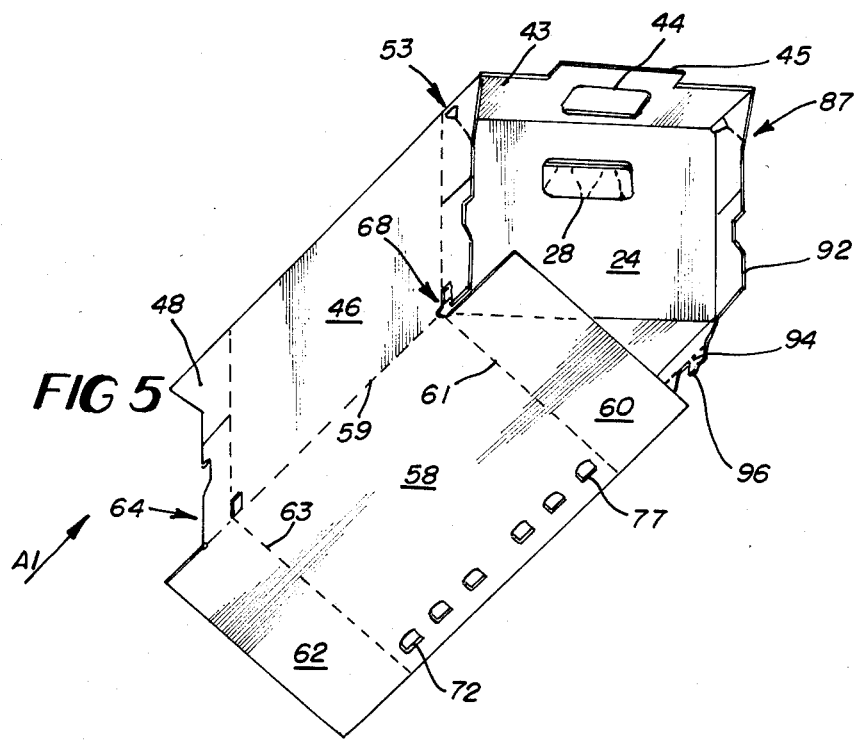
FIGS. 5, 6, 7, 8 and 9 show sequential views through which the wrapper of FIG. 4 is manipulated to form the completed fully enclosed article container as shown in FIG. 10.

In order to apply the disposable wrapper W to the reuseable and loaded case C as shown in FIG. 3, the wrapper is lowered from above the case so that the main panel 31 overlies and coincides with the upper open end of the case C. Side panels 46 and 80 are folded downwardly so that side panel 46 overlies side wall 3 of case C and so that side panel 80 of wrapper W overlies side wall 2 of case C. Bottom panel 58 is then folded inwardly along fold line 59 and the parts then appear as shown in FIG. 5, all such operations being performed by machine manipulation.

Figure 6:
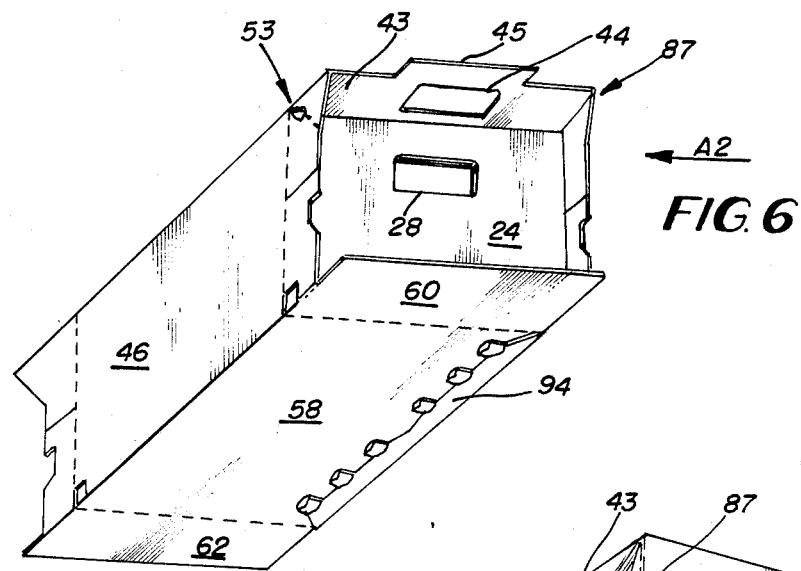

Thereafter bottom panel 58 is folded inwardly and locking strip 94 is folded inwardly into overlying relation with an edge of bottom panel 58. The locking tabs 96-101 are then respectively inserted into locking relation with the locking apertures 72-77. During these machine manipulated steps, the direction of travel of the case C and of the wrapper W is in the direction indicated in FIG. 5 by the arrow A1 and the structure appears when locked as shown in FIG. 6. Thereafter the case and wrapper are rotated 90 degrees about a vertical axis and the direction of travel is then as indicated by the arrow A2 in FIG. 6. This orientation enables machine elements to plow and fold the upper and lower end panels as well as the collapsible web structures and end flaps in proper sequence and into their final positions whereby the ends of the structure are fully closed except for the hand gripping apertures. It is obvious that the hand gripping apertures of the wrapper W must fall into coincidence with the adjacent hand gripping apertures in case C.

Figure 7:
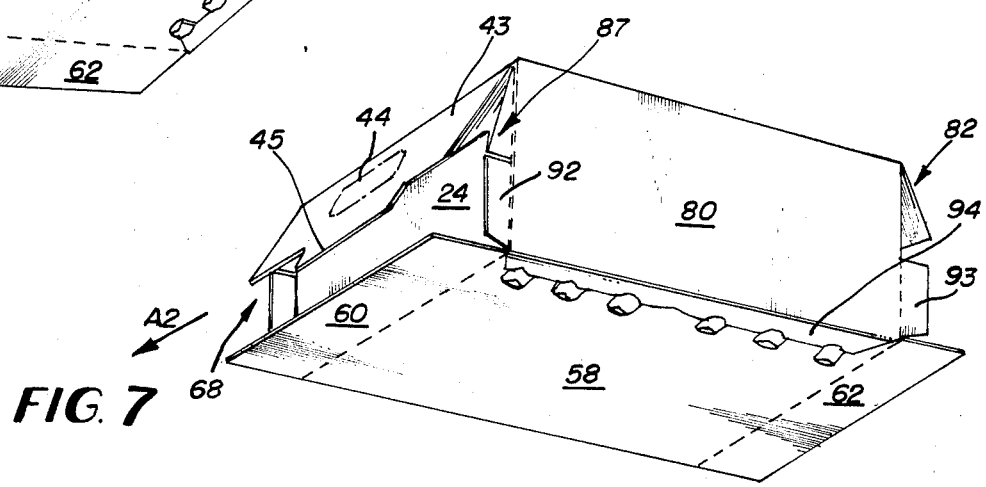
Figure 8:
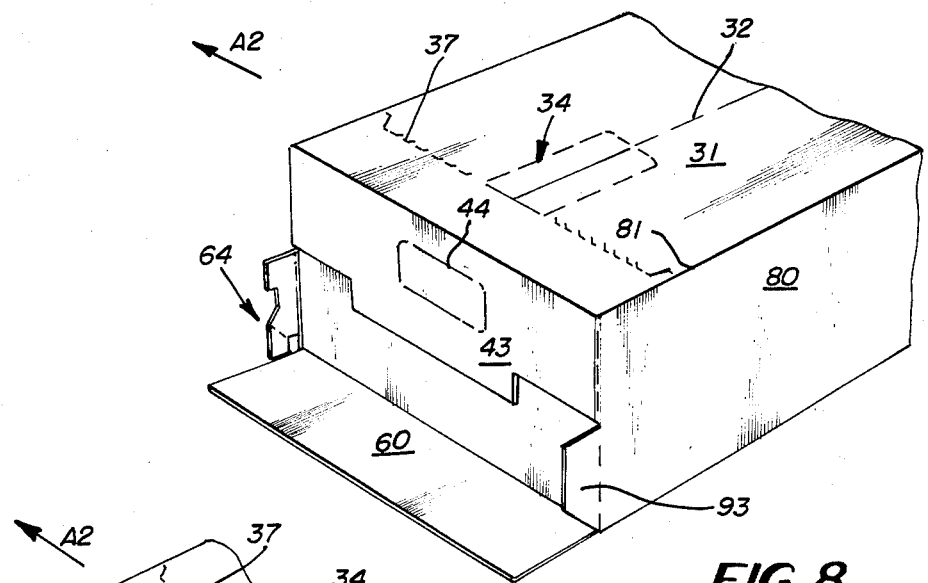
Figure 9:
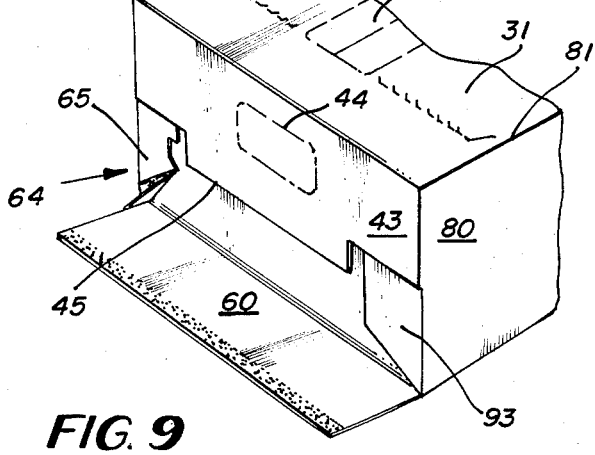
Figure 10:
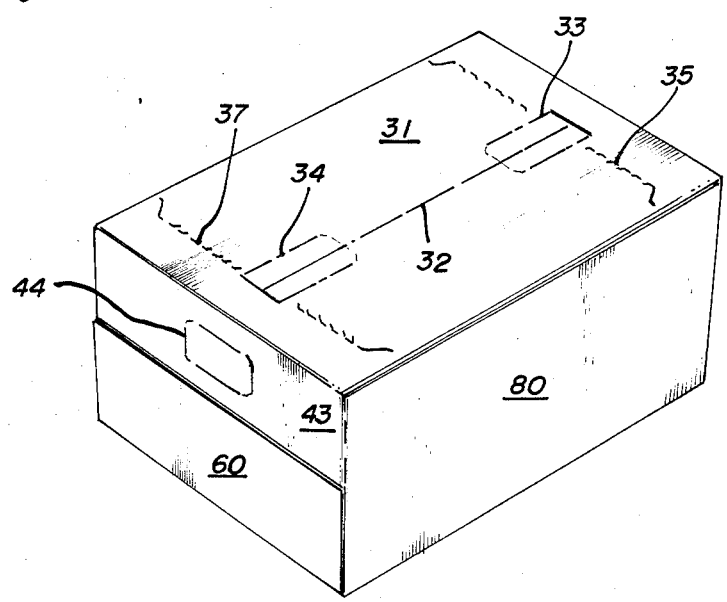

The structure is moved through the machine by a pusher element not shown but which engages side panel 80 and this pressure squares up the trailing side of the structure and prevents undesirable outward bowing of the side panel 80. In view of this fact, the flaps 92 and 93 are adequate and web structures at these corners are not necessary. However on the leading side of the carton there is no pusher structure or equivalent leading device so that in order to prevent outward bowing of the side panel 46, web structures 64 and 68 are utilized in accordance with one facet of this invention. The structure as shown in FIG. 7 is manipulated so as to fold the upper end panels 39 and 43 downwardly so as to collapse the web structures 48 and 82 and 87 and 53 after which the structure appears as shown in FIG. 8. If desired, the web structure 48 and 53 may be folded so as to lie between the side panel 46 and the end wall 3 and the web structure 82 and 87 may be folded so as to be between the side panel 80 and the side wall 2. Thereafter the collapsible web structure 64 is swung inwardly to the position shown in FIG. 9 and the end flap 93 is folded inwardly to occupy the position shown in FIG. 9. Identical operations are simultaneously performed at the other end of the structure. An application of glue is then made to the inner surface of lower end flap 60 as indicated by stippling on that flap. Flap 60 is then folded upwardly to fully collapse the web structure 64 and to cause the upper edge of lower end panel 60 to become adhered to downwardly projecting part 45 of upper end panel 43, to the upper edge of end flap 93 and to the upper edge of web 65 to finish the structure which then appears as shown in FIG. 10. Identical operations are simultaneously performed at the other end of the structure as is obvious.

As is apparent from the above description, the overwrap W is applied by efficient, high speed machine manipulation and the overwrap completely covers the exterior surfaces including the bottom wall of case C. In addition the fact that the wrapper W is formed of quality paperboard rather than of E-flute board results in a smooth surface having no undesirable irregularities and makes possible clear and attractive printing. By this means, the case C may be reused a large number of trips while the wrapper W may simply be discarded at the end of each trip and a fresh new overwrap substituted thereby to enhance the security and appearance of the package while taking advantage of efficient high speed machine operations.

We claim:

1. An article container comprising a reusable case having a rectangular bottom wall, a pair of side walls joined respectively to opposite side edges of said bottom wall and projecting upwardly therefrom, and a pair of end walls joined respectively to opposite end edges of said bottom wall and respectively joined at their end edges to adjacent end edges of said side walls to form an open top structure, and a disposable overwrap having a rectangular main panel overlying said case, a pair of rectangular side panels foldably joined respectively to opposite side edges of said main panel and projecting downwardly in overlying relation respectively to said side walls, a pair of upper end panels foldably joined respectively to opposite end edges of said main panel and projecting downwardly in overlying relation respectively with said end walls, collapsible web structure interconnecting each end edge of each of said upper end panels with the adjacent end edge of each of said side panels, a rectangular bottom panel foldably joined to the bottom edge of one of said side panels and underlying said bottom wall, a pair of lower end panels foldably joined respectively to opposite ends of said bottom panel and projecting upwardly, in overlying, relation with said end walls and in face contacting relation with the lower portions of said upper end panels respectively and secured thereto, collapsible web structure interconnecting one end edge of each of said lower end panels with the adjacent end edge of one of said side panels, an end flap foldably joined to each end edge of the other of said side panels and secured to the inner surface of the adjacent one of said lower end panels, and means adjoining said bottom panel to the lower part of said other side panel.

2. An article container according to claim 1 wherein each of said upper end panels includes a downwardly projecting mid portion to which the adjacent one of said lower end panels is secured by glue.

3. An article container according to claim 1 wherein said means adjoining said bottom panel to the lower part of said other side panel comprises a locking strip foldably joined to the bottom edge of said other side panel and disposed in underlying relation with the adjacent part of said bottom panel, and means releasably interconnecting said locking strip and said adjacent part of said bottom panel.

4. An article container according to claim 3 wherein said means releasably interconnecting said locking strip and said adjacent part of said bottom panel comprises a plurality of locking tabs foldably joined to said locking strip and arranged to cooperate respectively with a plurality of locking apertures formed in said adjacent part of said bottom panel.

5. An article container according to claim 1 wherein a pair of weakened severance lines are formed in said main panel and disposed respectively in parallel closely spaced relation to end edges of said main panel.

6. An article container according to claim 5 wherein a hand access means is formed in said main panel and disposed astride each of said weakened severance lines.

7. An article container according to claim 6 wherein a medial tear line is formed in said main panel and in communication with said hand access means whereby portions of said main panel may be severed to afford access to articles within the container.

8. An article container according to claim 1 wherein said reusable case is formed of corrugated paperboard and said disposable overwrap is formed of folding paperboard.

* * * * *